(12) United States Patent
Parruck et al.

(10) Patent No.: US 11,748,690 B2
(45) Date of Patent: Sep. 5, 2023

(54) SYSTEMS, METHODS, AND DEVICES FOR GENERATING A SHIPMENT ORDER BASED ON WIRELESS TRACKER INFORMATION

(71) Applicant: ROAMBEE CORPORATION, Santa Clara, CA (US)

(72) Inventors: Bidyut Parruck, Santa Clara, CA (US); Andrew Peebles, Santa Clara, CA (US); Santanu Das, Monroe, CT (US)

(73) Assignee: Roambee Corporation, Santa Clara, CA (US)

( * ) Notice: Subject to any disclaimer, the term of this patent is extended or adjusted under 35 U.S.C. 154(b) by 309 days.

(21) Appl. No.: 14/743,178

(22) Filed: Jun. 18, 2015

(65) Prior Publication Data
US 2016/0371643 A1    Dec. 22, 2016

(51) Int. Cl.
*G06Q 10/08*       (2023.01)
*H04W 4/029*       (2018.01)
*G06Q 10/0833*     (2023.01)

(52) U.S. Cl.
CPC ........ *G06Q 10/0833* (2013.01); *H04W 4/029* (2018.02)

(58) Field of Classification Search
CPC ............ G06Q 10/0833; G06Q 10/083; G06Q 10/08355; G06Q 10/0836; H04W 4/02; H04W 4/029
USPC ....................................................... 705/333
See application file for complete search history.

(56) References Cited

U.S. PATENT DOCUMENTS

| | | | |
|---|---|---|---|
| 2006/0074791 A1* | 4/2006 | Jelaco | G06Q 10/08 705/37 |
| 2008/0228514 A1* | 9/2008 | Robinson | G06Q 10/08 705/1.1 |
| 2012/0235791 A1* | 9/2012 | Donlan | G06Q 10/0833 340/10.1 |
| 2013/0317884 A1* | 11/2013 | Chidlovskii | G06Q 10/025 705/7.31 |

(Continued)

OTHER PUBLICATIONS

Johnstone,R William. Protecting Transportation: Organizing, Funding, Implementing, and Evaluating Transportation Security. Oxford: Elsevier Science & Technology, Jan. 30, 2015.*

(Continued)

*Primary Examiner* — Paul Danneman

(57) ABSTRACT

Embodiments of the present disclosure include systems, methods, and devices for generating a shipment order based on wireless tracker information. Embodiments may include a computer server that stores a shipment origin for a shipment. Further, embodiments include a wireless tracker associated with the shipment that determines first current location(s) for the wireless tracker using a global positioning system (GPS) and sends the first current location(s) of the wireless tracker to the computer server. In addition, the computer server may receive the first current location(s) from the wireless tracker as well as determine whether the one of the first current locations is outside a shipment origin geo-zone. Moreover, embodiments may determine one or more shipment destinations based on the shipment origin, one of the first current locations, and a predefined list of shipment locations and generate a shipment order based on the one or more shipment destinations and shipment origin.

14 Claims, 19 Drawing Sheets

(56) References Cited

U.S. PATENT DOCUMENTS

| | | | | |
|---|---|---|---|---|
| 2013/0321211 A1* | 12/2013 | Chakraborty | ........ | G06Q 10/087 |
| | | | | 342/451 |
| 2015/0039267 A1* | 2/2015 | Busch | .................... | G07C 5/008 |
| | | | | 702/182 |
| 2016/0110976 A1* | 4/2016 | Mains, Jr. | ............. | H04W 4/029 |
| | | | | 340/572.8 |

OTHER PUBLICATIONS

Fosso Wamba, Samuel; Takeoka Chatfield, Akemi. The impact of RFID technology on warehouse process innovation: A pilot project in the TPL industry. Information Systems Frontiers; New York vol. 13, Iss. 5, (Nov. 2011): 693-706. (Year: 2011).*

Kusmanto, Robin Agung. Modeling and simulation of an optimized wireless network in a Naval ship system of systems. Purdue University. ProQuest Dissertations Publishing, 2009. (Year: 2009).*

Murrugarra, Ruth Isabel. Dynamic estimation and prediction of travel times using multi-sensor data fusion and optimal selection and location of sensors. Rensselaer Polytechnic Institute ProQuest Dissertations Publishing, 2011. (Year: 2011).*

* cited by examiner

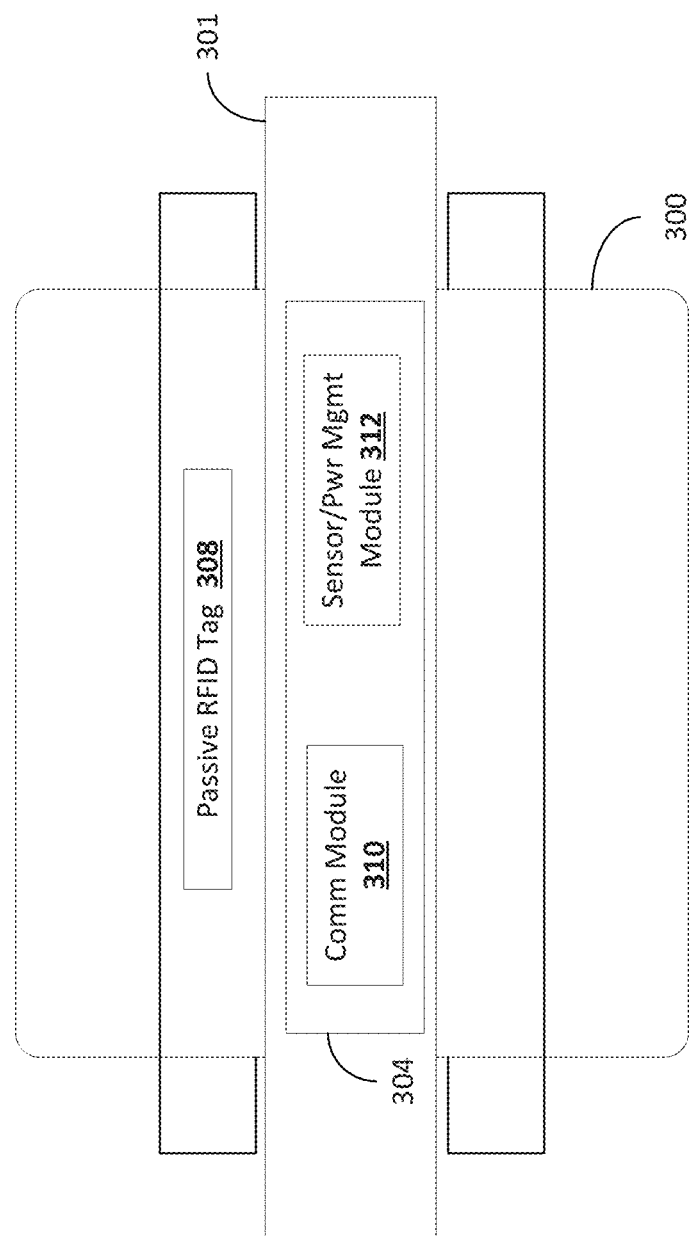

SYSTEMS, METHODS, AND DEVICES FOR GENERATING A SHIPMENT ORDER BASED ON WIRELESS TRACKER INFORMATION

CROSS-REFERENCE TO RELATED APPLICATIONS

The present application is related to U.S. patent application Ser. No. 14/656,189 filed on Mar. 12, 2015 and U.S. Patent Application No. 61/951,555 filed on Mar. 12, 2014 both of which are herein incorporated by reference in their entireties.

BACKGROUND

Many companies ship products to customers or ship product parts or other supplies to different offices within a company that are in geographic disparate locations or receive raw materials or semi finished products or finished goods from one or more suppliers. Traditionally, conventional shipment delivery systems track a shipment from a shipment origin to a shipment destination. Typically, the shipper generates a shipment order that includes a shipment label with a unique identifier that references the shipment (e.g. Serial Shipping Container Code (SSCC), Global Trade Item Number (GTIN), Billing of Lading (BOL), Lorry Receipt (LR), or any other reference number) in the form of a human readable and/or scanning code (e.g. bar code, QR code, or any other symbology). Such a code is used by the shipment delivery company to track the shipment at each intermediate location along the path from the shipment origin and the shipment destination. Typically in scanned based logistics, the third party transporter who picks up the shipments from the shipment origin for delivery generates another reference human readable and/or scanning code number also called a package tracking number. When the shipment has reached an intermediate location or shipment destination, this code on the shipment label is scanned by shipment delivery personnel and recorded into a computer system, operated by a shipment delivery company. Further, a notification (typically in the form of an email) may be delivered to the shipper to notify them as to the progress of the shipment. This system is prone to delays and the shipper may only know about the shipment progress when the transporter's package tracking number is scanned at fixed points in the supply chain. Most times, these package tracking numbers are not associated with shipper's shipment reference number making it difficult to cross reference orders with shipment containers (such as a box, pallet, Less Than Truck Load (LTL, Full Truck Load (FTL), containers, bulk consignments and others).

Such conventional scan-based shipment systems can be difficult to use by both the shipper and company personnel of the shipment delivery company. For instance, a shipment order needs to be generated prior to the start of the shipment being delivered. Entering shipment information for a shipment order is time consuming and tedious as well as error-prone as individuals may need to enter information in a hurry (thereby causing mistakes) as the several shipments need to be generated at once by the shipper. It may also require the shipper to associate the shipment order number with the transporter's own tracking number creating a myriad of cross reference issues or problems, making it difficult to track these shipments in transit.

Accordingly, there is a need for a sensor based shipment systems, methods, and devices for generating a shipment order based on wireless tracker information. Thus, if the shipper does not have the need to either generate a shipment order prior to the start of shipment or need to enter shipment information for the shipment, mistakes as well as the effort in entering shipment information into the shipment delivery systems.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 3A and 3B are functional block diagrams of a wireless tracker, in accordance with some embodiments.

Figure 1:
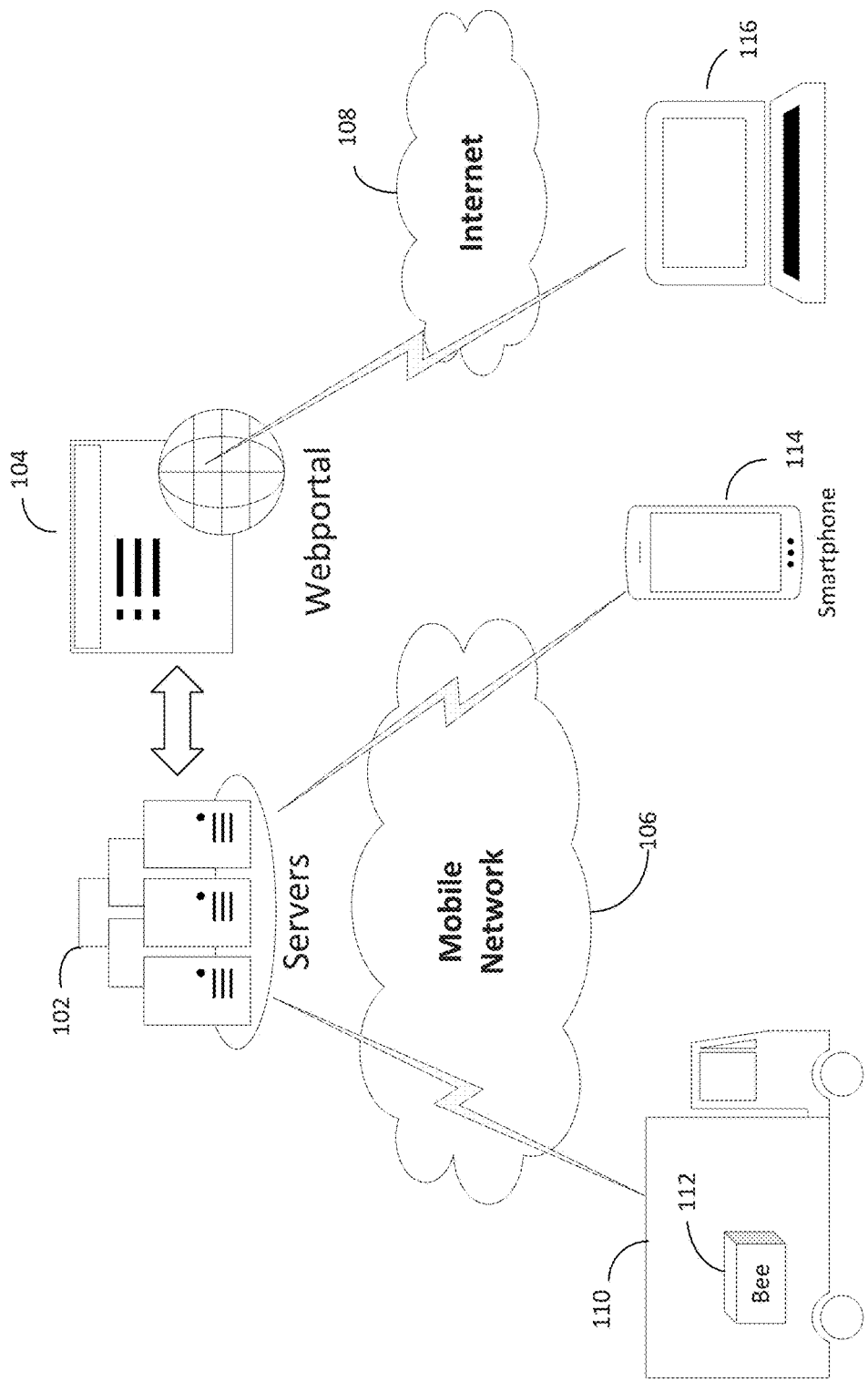
FIG. 1 is a functional block diagram of a system for generating a shipment order based on wireless tracker information, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as processor with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein as "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

Embodiments of the present disclosure include systems, methods, and devices for generating a shipment order based on wireless tracker information. Such embodiments may include a computer server that stores a shipment origin for a shipment. Further, such embodiments include a wireless tracker associated with the shipment that determines one or more first current locations for the wireless tracker using a global positioning system (GPS) and/or through Global System for Mobiles (GSM) and sends the first current location(s) of the wireless tracker to the computer server. In addition, the computer server may receive the one or more first current locations from the wireless tracker as well as determine whether the one of the first current locations is outside a shipment origin geo-zone. Moreover, such embodiments may determine one or more shipment destinations based on the shipment origin, one of the first current locations, and a predefined list of shipment locations as well as generate a shipment order based on the one or more shipment destinations and shipment origin.

FIG. 1 is a functional block diagram of a system 100 for generating a shipment order based on wireless tracker information, in accordance with some embodiments. Such a system 100 includes one or more computer servers 102 that may host a web portal 104 or other user portal. A user device 116 such as a smartphone, tablet computer, laptop computer, and desktop computer may access the web portal 104 over the Internet 108. Alternatively, a user device 114 may access the computer server(s) 102 across a mobile network 106. In addition, a shipment with a wireless tracker 112 may be on a shipping transportation vehicle 110 and is in communication with the computer server(s) 102 over the mobile network 106.

The system 100 allows a shipment order to be automatically generated by the computer server(s) for a shipper based on the information received from the wireless tracker as well as a predefined list of shipment locations. A shipper may be a company or any entity that uses shipment services to deliver goods across geographical disparate shipment locations. For example, shipment locations for a shipper may correspond to origin, destination or intermediate transit points that are typically manufacturing plants, distribution centers, warehouses, stores, depots or research and development facilities. The predefined list of shipment locations may be received or determined by the computer server(s) 102 in different ways and may be marked as shipment origins, shipment destinations or both or intermediate way points. In one embodiment, a shipper may use a user device (114, 116) to access a web portal 104 then enter the predefined list of shipment locations such that the predefined list of shipment locations can be stored by the computer server(s). In second embodiment, the shipper's order management system is seamless integrated with web portal (104) and exchanging and updating shipment order information automatically in computer server(s) 102. In another embodiment, the wireless tracker 112 provides the computer server(s) 102 with its current location and a time period the wireless tracker has remained stationary. With such information the computer server(s) then determines whether the current location of the wireless tracker is a pre-defined shipment location or a new location. By determining shipment locations in this manner, the computer server(s) can construct a predefined list of shipment locations in such an ad-hoc scheme.

Figure 2A:
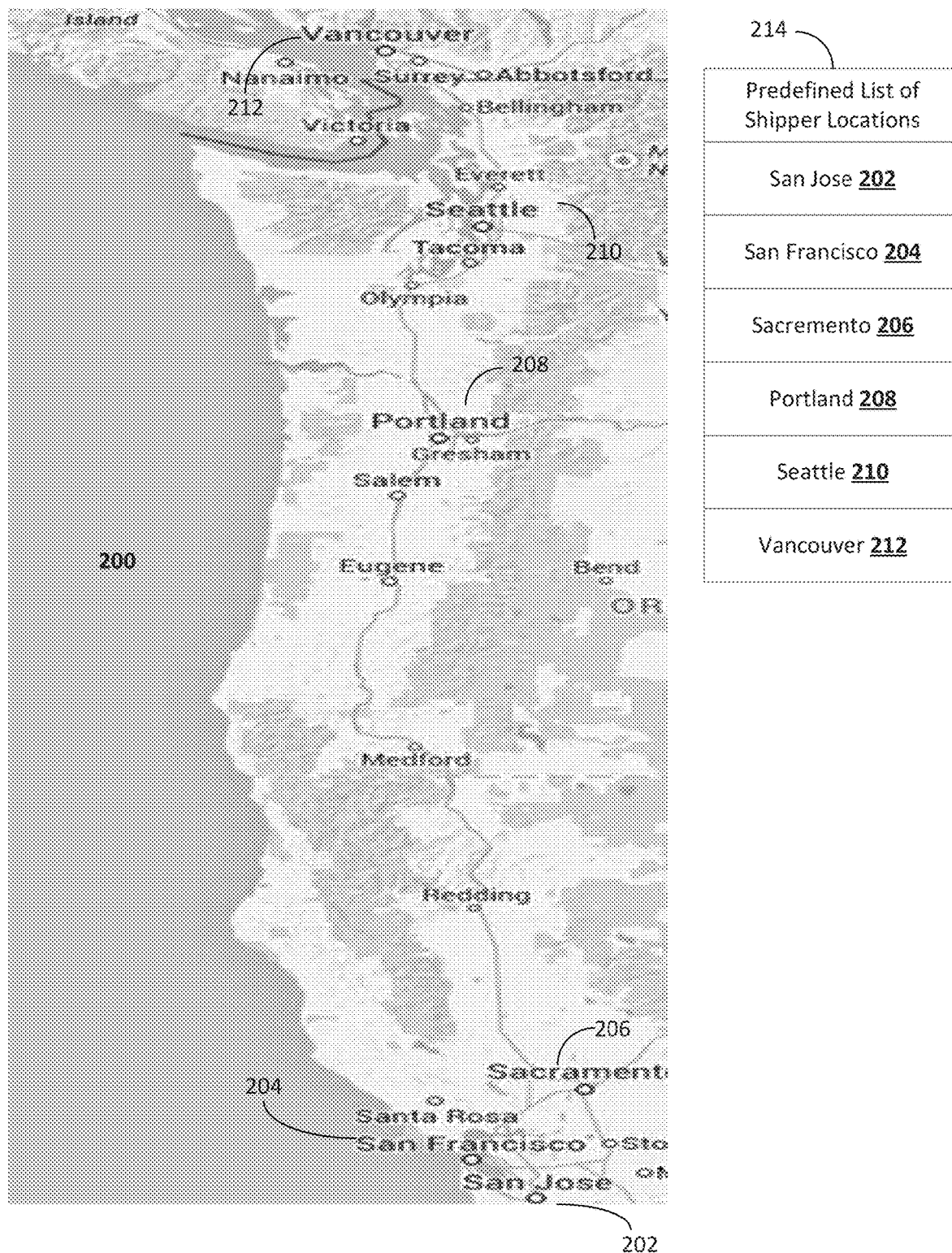
FIGS. 2A-2G are maps showing an implementation of a system for generating a shipment order based on wireless tracker information, in accordance with some embodiments.

Referring to FIG. 2A, a map 200 of western North America is shown as well as an example predefined list 214 of shipment locations. A map 200 and the predefined list of shipment locations include cities such as San Jose 202, San Francisco 204, Sacramento 206, Portland 208, Seattle 210, and Vancouver 212. These cities (202-212) are locations where a shipment may originate, be destined, or be an intermediate point (e.g. waypoint) for shipment delivery. Such a predefined list of shipment locations may be received by the computer server(s) 102 from a shipper computing device (114-116). Note, the shipper computing device may include, but is not limited to, shipper user device (e.g. laptop computer, notebook computer, desktop computer, tablet computer, etc.) or a shipper computer server. Further, the computer server(s) 102 stores the predefined list of shipment locations in a storage device coupled to the computer server(s) 102.

Prior to a shipment order being generated, a wireless tracker 112 affixed, coupled or otherwise associated to contents of the shipment determines a location for the wireless tracker using a global positioning system (GPS) or GSM. Alternatively, the location for the wireless location can be found using GSM triangulation. Persons of ordinary kill in the art would understand that a location determined using a GPS can also be found using GSM triangulation. Thus, location determination and location determination systems, devices, and methods as described herein can be found either through a GPS or through GSM triangulation.

Such a determined location of the wireless tracker is provided to the computer server(s) 102. The computer server(s) 102 compare the provided location of the wireless tracker 112 to the predefined list of shipper locations. If the location of the wireless tracker 112 is determined by the computer server(s) 102 to be within a certain threshold of distance (configurable by the operator, manufacturer, user, etc. of the system or by another integrated system(s)) to one of the shipper locations on the predefined list, then the computer server(s) 102 stores such a determined shipper location as the shipment origin (or intermediate location). However, if the location of the wireless tracker 112 is determined not to be within a certain threshold of distance to one of the shipper locations on the predefined list, then the computer server(s) 102 does not designate a shipment origin at that time.

Further, if a shipment origin is determined and stored by the computer server(s) 102, the wireless tracker 112 associated with the shipment may further determine one or more further current locations for the wireless tracker 112 as the shipment is being delivered using a GPS. In addition, the wireless tracker 112 may send the one or more further current locations of the wireless tracker 112 to the computer server(s) 102. The wireless tracker 112 may be programmed or configured to determine its current location at regular time intervals, irregular time intervals, regular distance intervals, irregular distance intervals, or any other interval. For example, the wireless tracker may be configured to determine using location determination methods that the wireless tracker has exited a geo-zone. Further, a geo-zone may be of any geometry or arbitrary shape around the shipment location. Such a geo-zone may be any regular or irregular shape (See FIG. 2B). In addition, the computer server(s) 102, automatically (configured) or upon a user input, send a request to the wireless tracker 112 to provide its current location.

Moreover, the computer server(s) 102 receives the one or more current locations from the wireless tracker 112. Subsequently, the computer server(s) 102 may determine whether the one of the current locations of the wireless tracker 112 is outside a shipment origin geo-zone (See FIG. 2B).

Figure 2B:

Referring to FIG. 2B, a more detailed map 220 of the map 202 in FIG. 2A is shown. The detailed map 220 includes shipper locations San Jose 202 and San Francisco 204. A wireless tracker 112 associated with a shipment provides a current location 224 to the computer server(s) 102. Further, the computer server(s) 102 determine that the shipment origin to be San Jose 202. In addition, the wireless tracker 112 may provide a further current location 226 along Interstate Highway 280. Such a further current location 226 is determined to be outside a shipment origin geo-zone 222. Such a shipment geo-zone or any other geo-zones may be programmed or configured into the computer server(s) 102. Further, geo-zones may be configured to be any regular or irregular shape.

In a further embodiment, the wireless tracker 112 determines additional current locations of the wireless tracker 112 and sends the additional current location(s) of the wireless tracker 112 to the computer server 102. Further, the computer server(s) 102 receive the additional current locations of the wireless tracker 112 and sends a notification to a shipper computing device (114-116) that includes one of the additional current locations of the wireless tracker 112. Thus, referring to FIG. 2B, upon receiving current location 226 from the wireless tracker 112, the computer server(s) 102 may send a notification that includes the current location 226 to the shipper computing device (114-116) informing the shipper a start of the shipment delivery or the progress of the shipment delivery.

Figure 2C:
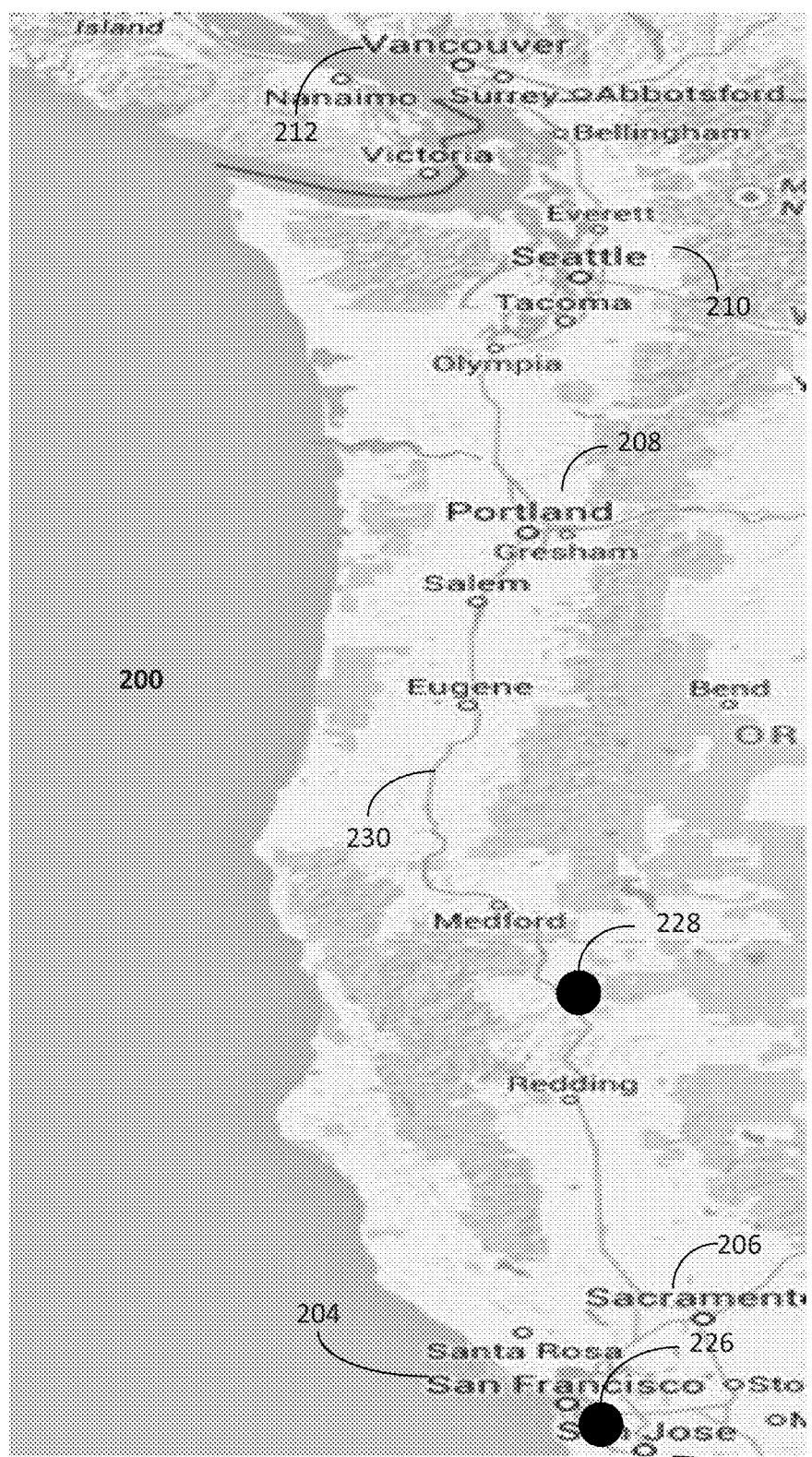

In another embodiment, once the computer server(s) 102 determines that the shipment is outside the shipment origin geo-zone 222, then the computer server(s) determine a one or more possible shipment destinations based on the shipment origin, one of the current locations, and a predefined list of shipment locations. Referring to FIG. 2C that shows map 200 and a current location 226 of the wireless tracker 112. At this location, the computer server(s) 102 may determine that San Francisco 204, Sacramento 206, Portland 208, Seattle 210 and Vancouver 212 are possible shipment destinations based on San Jose 202 being the shipment origin and the shipment is traveling in a northerly direction. This may be determined by the computer server(s) 102 by analyzing the predefined list of shipper locations 214 as well as map data as shown in map 200. Further, the computer server(s) 102 may calculate a direction of travel based on the current location of the wireless tracker 102 and a previous location of the wireless tracker (such as location 224 shown in FIG. 2B). In the example shown in FIG. 2B-2C show that the direction of travel of the shipment to be north of San Jose 202. Thus, if there were any shipper locations on the predefined list that are south of San Jose (e.g. Santa Cruz, not shown) then such shipper locations would not be considered possible shipment destinations by the computer server(s).

The computer server(s) may then generate a shipment order based on the possible one or more shipment destinations and the shipment origin. A shipment order includes, but is not limited to, an order associated with a shipment having a shipment origin and a possible destination. The cost of delivering the shipment is based at least in part on the distance between the shipment origin and the shipment destination. (Other factors that affect cost of delivery include weight of shipment, shipment type, etc.). However, a shipment order may also include, but is not limited to, an order associated with the shipment having a shipment origin and one or more possible shipment destinations. The cost of the delivering the shipment from the shipment origin to one or more possible destination may be determined by the computer server(s) based on configured or programmed metrics.

In one embodiment, the computer server(s) 102 may receive content information regarding the shipment, either from a shipper computing device (114-116) or a computer operated by the shipment delivery company. Further, the computer server(s) 102 store the content information regarding the shipment. In such an embodiment, the shipment order may be generated based on the content information in addition to the shipment origin and possible shipment destinations.

In other embodiments, the computer server(s) 102 may generate the shipment order based on one or more predefined templates and shipment attributes. Predefined templates include the look, feel, and overall aesthetic appearance of the shipment order as well as the format and required shipper information needed in every shipment order (e.g. shipper address, telephone number, shipper contact person, etc.). Shipment attributes includes shipment contents, weight, size, domestic or international, type of travel (e.g. ground, air, sea, drone, multi-modal etc.), expediency (e.g. next-day delivery, two-day delivery, standard delivery, etc.) as well as any other shipment attributes. For example a predefined template for shipment order may have all the attributes to infer that all shipments of product type iPhone 5S 16 GB, White will originate from San Jose (202) and of the many pre-defined shipment delivery destinations can only be delivered to Vancouver (212), Seattle (210) locations.

Further, a shipper may receive at a shipper computing device (114-116) a notification of a generated shipment order. Upon reviewing the shipment order, a shipper or shipper personnel may use one or more modules implemented by the shipper computing device (114-116) to edit the shipment order based on user input entered into a user interface of the shipper computing device (114-116). Further, the computer server(s) 102 receives user input to edit the shipment order. Such edits may include, but are not limited to, changing the shipment destination, contents of the shipments, or any shipment attributes.

In further embodiments, the computer server(s) 102 determine that one of the possible shipment destinations is excluded based on the one of the current locations of the wireless tracker 112. For example, referring to FIG. 2C, a current location 228 of the wireless tracker 112 shows that the shipment is traveling north on Interstate Highway 5 (230) based on the previous locations (224, 226) of the wireless tracker 112. Thus, when comparing the current location 228 of the wireless tracker 112, the direction of travel (e.g. north), and the predefined list of shipper locations, the computer server(s) 102 determines to exclude San Francisco 204 and Sacramento 206 as possible shipment destinations thereby generating or updating the shipment order.

In another embodiment, the wireless tracker 112 may determine one or more additional current locations of the wireless tracker 112. Further, the wireless tracker 112 sends the additional current locations of the wireless tracker 112 to the computer server(s) 102. Upon receiving additional current locations of the wireless tracker 112, the computer server(s) may determine an exact shipment destination based on some criteria and determine an (updated) estimated time to arrival based on one of the additional current locations. Further, the computer server(s) 102 may send a notification to a shipper computing device (114-116) with the (updated) estimated time to arrival.

Figure 2D:
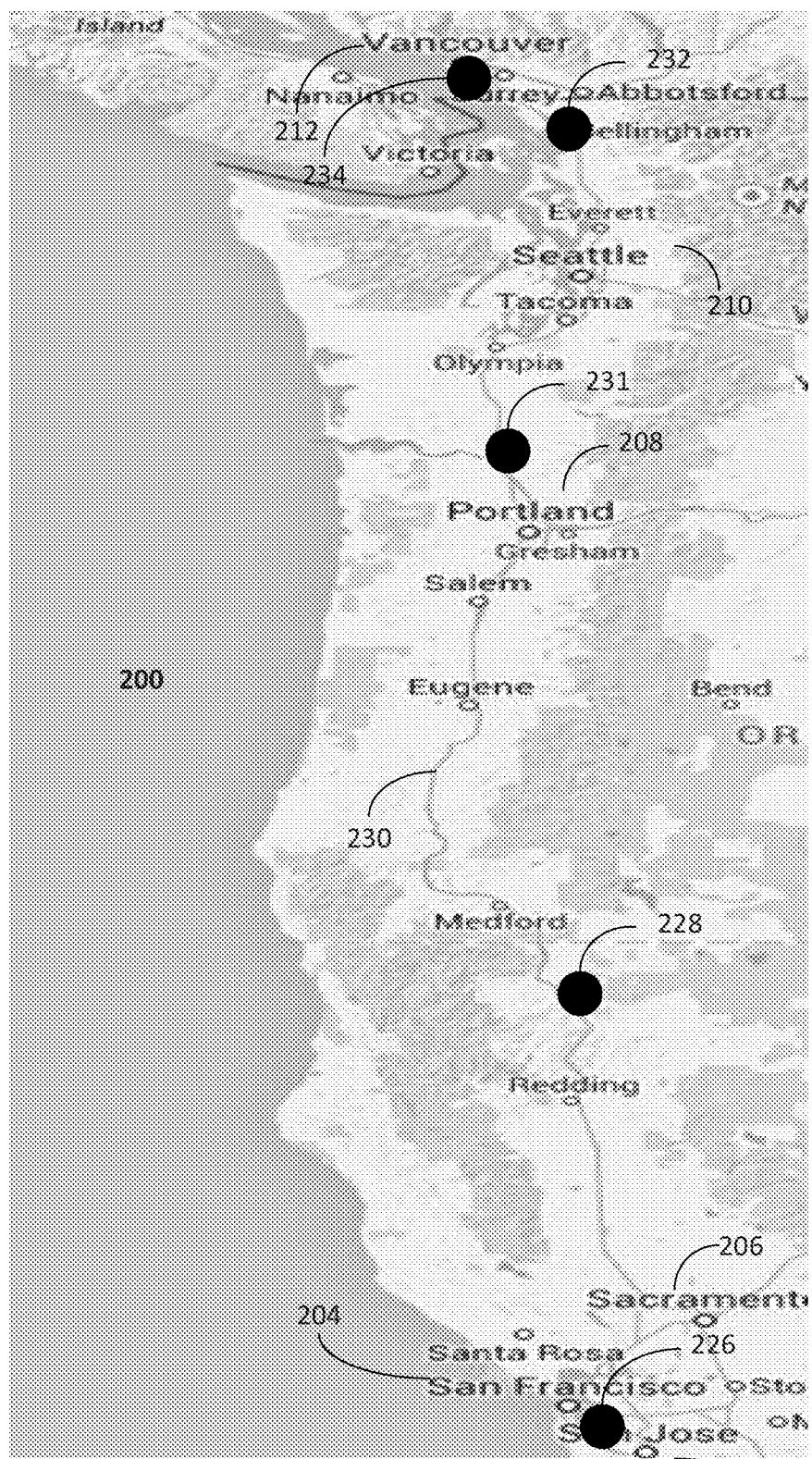

Referring to FIG. 2D, additional current locations may be at point 231 and 232 and a previous current location may be 228, all of which have been transmitted to the computer server(s) 102 by the wireless tracker 112. Upon analyzing previous current location 228 with the map data 200 and predefined list of shipper locations, the computer server(s) 102 may determine that possible shipment destinations include Portland 208, Seattle 210, and Vancouver 212. Further, upon analyzing additional current location 231 with the map data 200 and predefined list of shipper locations, the computer server(s) 102 may determine that possible shipment destinations include only Seattle 210 and Vancouver 212 excluding Portland 208. In addition, upon analyzing additional current location 232 with the map data 200 and predefined list of shipper locations, the computer server(s) 102 may determine that exact shipment destination is Vancouver 212.

In additional embodiment, the computer server(s) may use further analytics and statistical probabilities to determine the exact shipment destination prior to receiving the additional current location 232. For example, upon receiving additional current location 230, the computer server(s) may determine that the possible shipments destinations include Seattle 210 and Vancouver 212. However, the time of day may be around 9:30 am. Computer server(s) 102 analyze prior delivery information for the shipper and determine that when a shipment is at or near additional current location 230 in the morning around 9:30 am, there is a high likelihood (e.g. 87%) that the shipment is destined to Vancouver 212 rather than Seattle 210. However, in an alternate example, when the time of day for the shipment at or near additional current location 230 is about 3:30 pm, then the computer server(s) 102 may determine that there is a high likelihood (e.g. 92%) that the shipment is destined for Seattle 210 rather than Vancouver 212 based on the prior delivery information. Computer server(s) 102 may process other analytics and statistics to determine likelihood of shipment destination as well as shipment delivery route including traffic, weather, types of roads, time of day, time of year, temporal distance to possible destinations, etc.

Upon determining a shipment destination, the computer server(s) 102 may send a notification to a shipper computing device (114-116) that includes an estimated time of arrival for the shipment based on the shipment destination and prior route delivery information for the shipment destination.

Figure 2E:
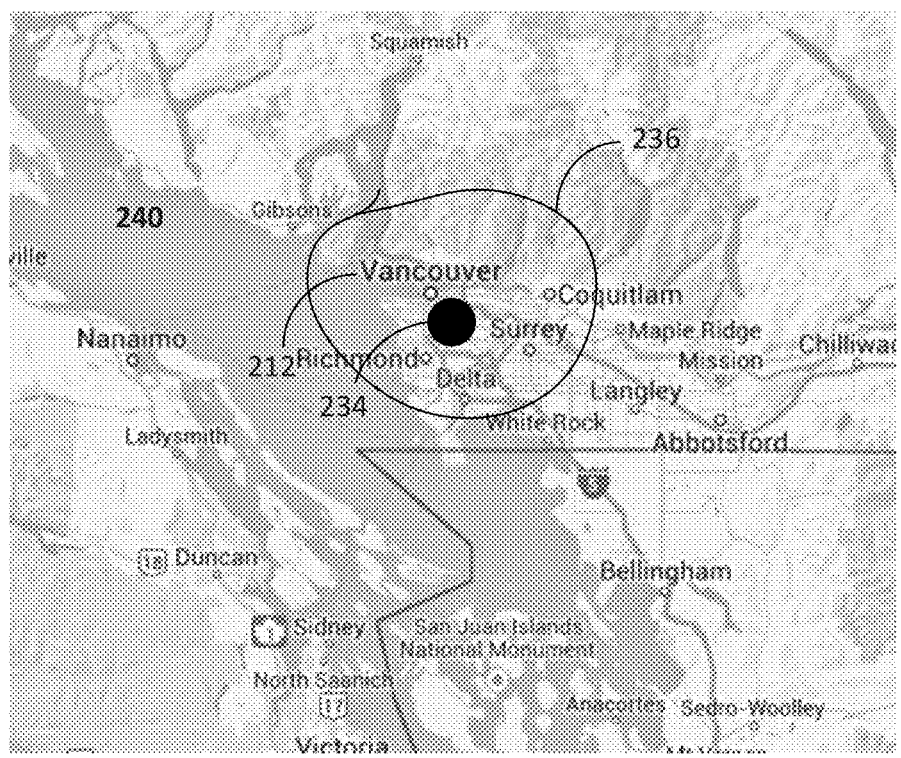

In another embodiment, the wireless tracker 112 determines additional current locations of the wireless tracker 112 such as location 234 (See FIGS. 2D and 2E). Further, the wireless tracker 112 sends the additional current locations of the wireless tracker 112 to the computer server(s) 102. In addition, the computer server(s) receive the additional current locations of the wireless tracker 112. Moreover, the computer server(s) determine whether the shipment has reached the shipment destination based on additional current location(s) of the wireless tracker 112 and whether such additional current location is within a destination geo-zone 236 (See map 240 in FIG. 2E). Also, the computer server(s) may send a notification to a shipper computing device (114-116) that the shipment has reached the shipment destination based on one of the additional current locations is within the destination geo-zone.

In other embodiments, the wireless tracker 112 determines additional current location(s) of the wireless tracker 112 and sends the additional current location(s) of the wireless tracker 112 to the computer server(s) 102. Further, the computer server(s) receive additional current location(s) of the wireless tracker 112. In addition, the computer server(s) determines a route deviation of the shipment based on one of the additional current location(s), the shipment destination, and prior route delivery information and sends a notification to a shipper computing device (114-116) that the there is a route deviation of the shipment.

Figure 2F:
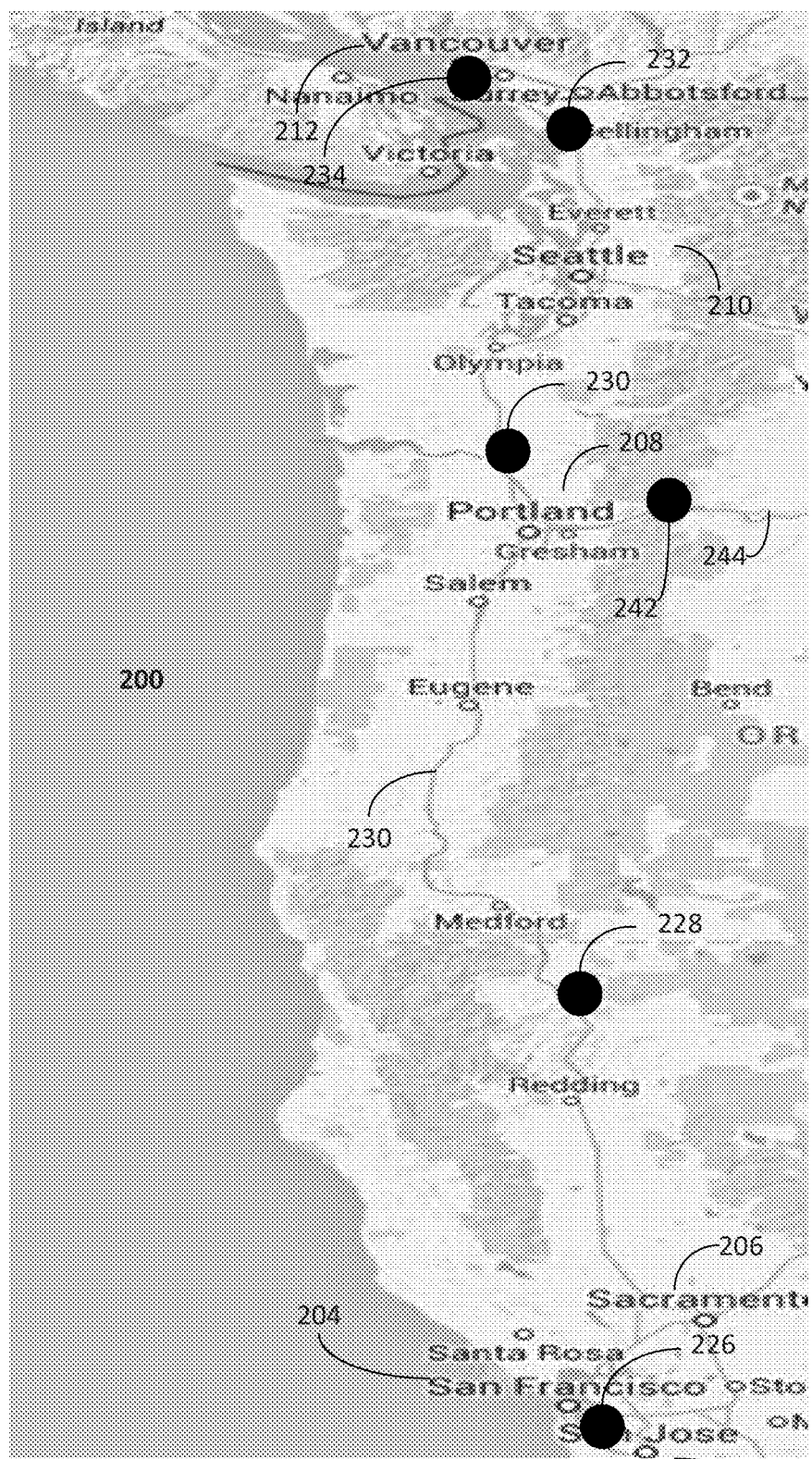

Referring to FIG. 2F, computer server(s) 102 receive a location 242 from the wireless tracker 112. The computer server(s) analyze the location 242 as well as the shipment destination or possible shipment destinations in addition to prior route delivery information. That is, prior route delivery information may indicate that the any shipment destined to either Seattle 210 or Vancouver 212 from Portland 208 travels north on Interstate 5 (230). However, the additional current location 242 indicates that there is a route deviation, namely, that the shipment is heading west on Interstate 84 (244). Upon determining a route deviation, computer server(s) 102 sends a notification of such a route deviation to a shipper computing device (114-116) and/or updated estimated time of arrival based on the route deviation.

In further embodiments, the wireless tracker 112 determines additional current location(s) of the wireless tracker 112 and sends the additional current location(s) of the wireless tracker 112 to the computer server(s) 102. Further, the computer server(s) receive the additional current location(s) of the wireless tracker 112 and determines that shipment has cleared customs, state lines, or country borders based on one of the additional current locations and at least one of a predefined list of customs locations or predefined list geo-zones surrounding a customs location, state line, or country border. In addition, the computer server(s) sends a notification to a shipper computing device that the shipment cleared customs, state lines, or country borders.

Figure 2G:
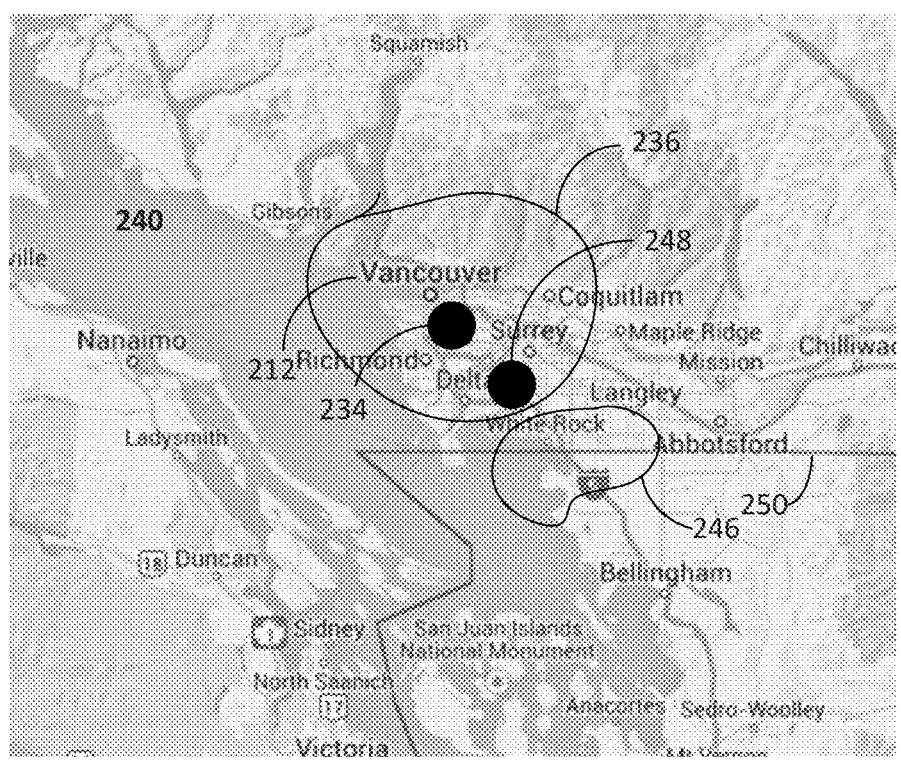

Referring to FIG. 2G, the map 240 shows an additional current location 248 that has cleared geo-zone 246 that is associated with a customs location. Such a customs location is along the US-Canada country border 250. Thus, when the computer server(s) 102 receive the additional current location 248 and determines that the shipment has cleared either customs or the country border, the computer server(s) may send a notification indicating as such to the shipper computing device (114-116).

In additional embodiments, the wireless tracker 112 determines additional current location(s) and sensor information from one or more sensors of the wireless tracker and sends the additional current locations and corresponding time for each additional current location as well as sensor information of the wireless tracker 112 to the computer server(s) 102. Further, the computer server(s) receive the additional current locations of the wireless tracker 112 and corresponding time, and sensor information and determines a trigger event occurred based on at least one of the additional current locations, corresponding time, or sensor information. In addition, the computer server(s) sends a notification to a shipper computing device (114-116) that includes the trigger event. Moreover, a trigger event includes, but is not limited to, a shipment exiting shipment origin, delay at an intermediate location, traveling after a delay, temperature deviation, humidity deviation, route deviation, accident to delivery vehicle (based on exceeding a threshold level of shock), difference in mode of transportation and shock to the delivery vehicle. Sensor may include, but are not limited to, temperature sensors, humidity sensors, location sensors, proximity sensors, accelerometers, acoustic, sound, vibration, automotive, transportation, chemical, electric current, electric potential, magnetic, radio, environment, weather, moisture, flow, fluid velocity, ionizing radiation, subatomic particles, navigation instruments, position, angle, displacement, distance, speed, acceleration, optical light, imaging, photon, pressure, force, density, level, thermal, heat, temperature, proximity, altimeter (altitude sensor), a location and presence, etc.

Another embodiment of the system in FIG. 1 may include a wireless tracker 112 associated with a shipment that determines a location for the wireless tracker 112 at each of a plurality of times from a global positioning system then sends two or more locations of the wireless tracker to one or more computer servers. Further, the computer server receives the two or more locations of the wireless tracker and calculates a vector for the shipment based on the two or more locations of the wireless tracker. In addition, the computer server determines a shipment origin and shipment destination of the shipment based on the vector of the shipment and a past shipment origin-destination pairs and generates a shipment order based on the vector.

Another embodiment of the system in FIG. 1, includes the ability for the shipper to review all the location points across all shipments for any given time period that are not pre-defined locations and choose one or many of these undefined locations and update the list of pre-defined locations by tagging it as an origin, destination, or an intermediate point in transit.

Figure 3B:
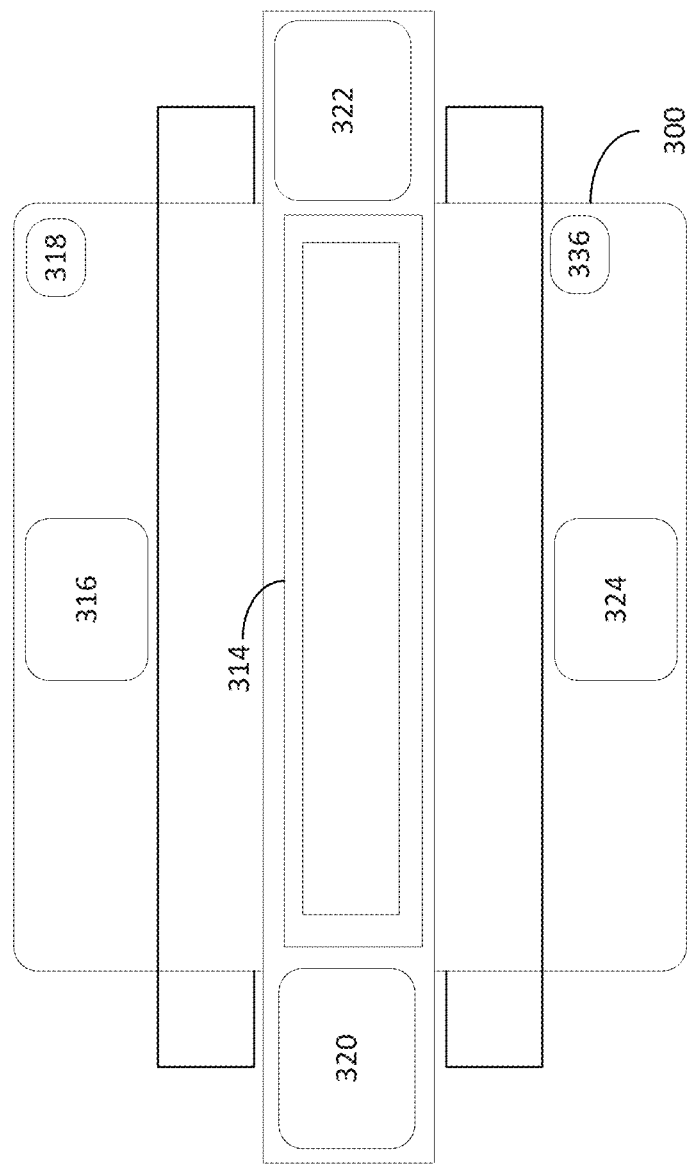

FIGS. 3A and 3B are functional block diagrams of a wireless tracker 300, in accordance with some embodiments. Referring to FIG. 3A, the wireless tracker 300 includes mail and response card box 301, communication module 310 and authentication module 304 that is a bolted onto an integrated circuit board. A passive radio frequency identification (RFID) tag 308 is affixed to the card box 301 and programmed to have a unique identity/identification.

The wireless tracker 300 may be manufactured and operated in part by a third party manufacturer but is used by a shipper or shipment delivery company. The third party manufacturer may own or operate one or more computer servers to communicate with the wireless tracker 300 over one or more wireless communication networks using the communication module 310. Further, the communication module 310 may be include one or communication interfaces configured to communicate over various wireless networks such as GPS, Zigbee, Zwave, WiFi, cellular/mobile, Bluetooth, WiMAX or any other wireless communication network. In addition, the communication module may have an interface to communicate with other devices over a wired network or a wired interface such as an Ethernet cable or USB interface. Such wired connections may be implemented when first configuring the wireless tracker 300 by the third party manufacturer prior to use.

The authentication module 304 is used to track the chain of custody of the shipment associated with the wireless tracker 300. In one embodiment, a shipper at a shipment origin may enter an authentication code into the authentication module 304. The authentication module 304 verifies the code either locally or transfer the authentication code to a computer server for verification. Once, the authentication code is verified the shipment with the wireless tracker 300 is shipped to the destination. A packing slip inside the shipment includes another authentication code. Upon receiving the shipment at the shipment destination, a receiver of the shipment may open the shipment to access the authentication code on the packing slip. The authentication code is entered through the user interface of the wireless tracker 300 or remotely through a remote computer device into the authentication module 304 and verified (either locally or at a server). In addition, the verification may include determining whether the wireless tracker 300 is at the shipment destination in accordance with the shipment order.

The RFID tag 308 is used to uniquely identify the wireless tracker 300. Thus, when the RFID tag is read at the shipment origin, the RFID tag is stored by the server and associated with the shipment. The RFID tag 308 may be read again at the shipment destination to verify the RFID tag is the same as the one read at the shipment origin.

The mail and response card box 301 allows the receiver at the shipment destination to mail the wireless tracker 300 back to the shipment origin or to a central location (e.g. shipper principal shipping location, third party manufacturer, etc.) to be reused for on another shipment. The sensor/power management module 312 manages the sensors and the battery power on the wireless tracker 300. This includes configuring the sensors and battery as well as receiving the status of the sensors and battery.

Referring to FIG. 3B, a side of the wireless tracker 300 may have one or more panels (316-326) as well as a foam pad 314. The foam pad 314 may be used to cushion or otherwise reduce vibration impacting the wireless tracker 300. Further, the shipping address may be entered onto panel 316 and associated prepaid postage affixed on panel 318. In addition, the Return to Sender Address may be entered onto panel 324 and associated prepaid postage affixed on panel 326. Advertisements may be affixed onto to panels 320 and 324 for additional revenue for the shipper, shipment delivery company, or third party manufacturer of the wireless tracker 300.

Figure 4:
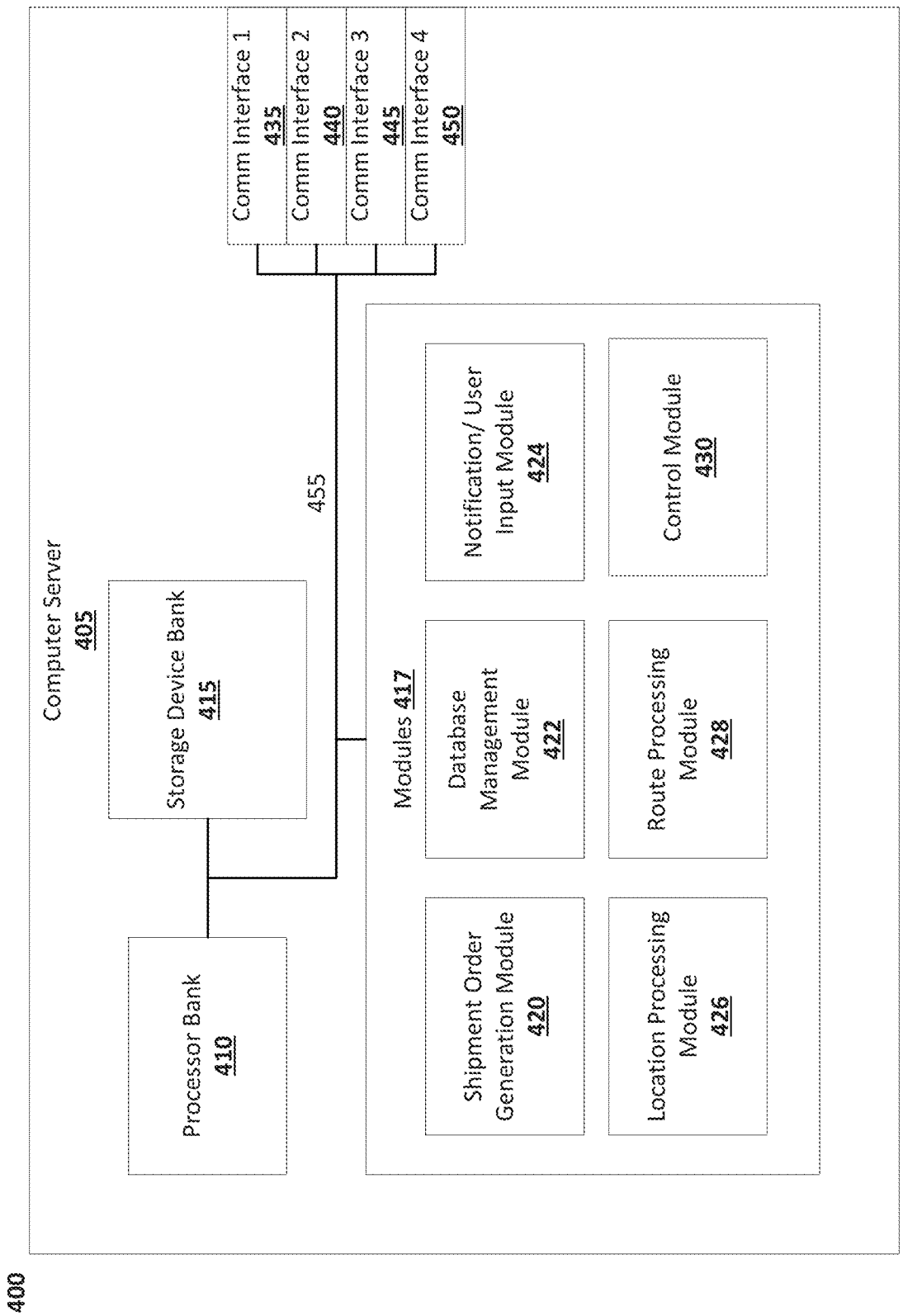
FIGS. 4-5 are functional block diagrams of devices used for generating a shipment order based on wireless tracker information, in accordance with some embodiments.

FIG. 4 is functional block diagram of a computer server for generating a shipment order based on wireless tracker information, in accordance with some embodiments. Such a server 405 may be used in a system shown in FIG. 1. The computer server 405 may include several different components such as a processor bank 410, storage device bank 415, one or more software applications, which may be executed by a processor. Thus, the combination of the software applications as well as the processor and any other hardware form specifically-configured modules 417. The computer server 405 also has one or more communication interfaces (435-450). The processor bank 410 may include one or more processors that may be co-located with each other or may be located in different parts of the computer server 405. The storage device bank 415 may include one or more storage devices. Types of storage devices may include electronic memory, optical memory, and removable storage media. The one or more modules 417 may include, but are not limited to, a shipment order generation module 420, database management module 422, notification/user Input module 424, location processing module 426, route processing module 428, and control module 430. The modules 417 may be implemented by the one or more processors in the processor bank 410.

The computer server 405 and any other server described in the present disclosure may include a database stored in a storage device bank or may be coupled to a database. Further, such a computer server may be part of a computer server system described herein that may include one or more computer servers and one or more databases. In the present disclosure, a computer server may, but not always, refer to embodiments that include a computer server system having one or more computer servers and one or more databases coupled to each other. The one or more computer servers may be co-located with each other or distributed among different locations. Likewise, the one or more one or more databases may be co-located with each other or distributed among different locations. In further embodiments, some of the one or more computer servers may be co-located and coupled to the one or more databases while in additional embodiments some of the one or more computer servers may be coupled to the one or more databases each of which are placed in different location. In still further embodiments, a computer server system may refer to at least one of a computer server and a database. The components shown in FIG. 4 may be located in one computer server or be distributed among more than one computer server and/or databases.

The shipment order generation module 420 receives shipment information and processes such shipment information to generate a shipment order. Such shipment information may include a predefined list of shipment location, contents of the shipment, predefined templates for a shipment order, predefined list of geo-zones, and shipment attributes as described herein. In addition, the location processing module 426 and route processing module 428 may provide the shipment order generation module 420 with information to determine a shipment origin as well as one or more shipment destinations. The shipment order generation module 420 generates a shipment order based on the one or more shipment destination and the shipment origin.

The database management module 422 manages the storage and access of shipment information used to either generate a shipment order or determine a trigger event to notify a shipper. Such shipment information may include predefined list of shipment location, contents of the shipment, predefined templates for a shipment order, list of geo-zones, and shipment attributes as described herein. Further, the database management module 422 may store one or more locations of the shipment that is provided by a wireless tracker. In addition, the database management module 422 may store information from one or more sensors coupled to and provided by the wireless tracker. Such location information and sensor information may be used to generate a shipment order and/or to determine a trigger event to notify the shipper.

The notification/user input module 424 may perform several different functions. One such function may be to receive user input from a shipper computing device. Such user input may be shipment information such shipment contents, shipment locations, etc. Such information may be used to edit a shipment order. Another function of the notification/user input module 424 to provide a notification based on a trigger event to the shipper computing device. A notification may be generated based on a trigger event determined by the different modules of the computer server 405 such as, but not limited to, the shipment order generation module 420, location processing module 426, and the route processing module 428.

The location processing module 426 may determine the location of the shipment based on one or more current locations received from the wireless tracker. Further, the location processing module 426 may access a Global Positioning System (GPS) information (e.g. map information) as well as geo-zone information surrounding one or more shipment locations. The location processing module 426 may process such information to determine one or more trigger events. Such trigger events may use the location processing module 426 to communicate with the notification/user input module 424 to send a notification based on the trigger event to the shipper computing device. In addition, once a location is determined by the location processing module 426, such location and associated location information may be provided to the route processing module 428.

For example, the location processing module 426 may receive a location of the shipment from the wireless tracker that indicates that the shipment is at the shipment origin. Further, the location processing module 426 has access to information that there is geo-zone surrounding the shipment origin. Subsequently, the location processing module 426 may receive a location of the shipment from the wireless tracker that indicates that the shipment has exited the geo-zone surrounding the shipment origin. The location processing module 426 determines that such an event is a trigger event and thereby communicates with the notification/user input module 424 to send a notification to the shipper computing device that the shipment has left the shipment origin.

The location processing module 426 may determine other trigger events that may cause a notification to the shipper computing device. Such trigger events may include estimating the time of arrival for the shipment based on the shipment destination and prior route delivery information for the shipment destination. Prior route delivery information may be stored and managed by the database management module 422. Further, the location processing module 426 may determine based on a current location received from the wireless tracker that the shipment has reached the shipment destination. In addition, the location processing module 426 may determine that a current location received from the wireless tracker has delayed the shipment and computes an updated estimated time for arrival time that is notified to the shipper computing device. Moreover, the location processing module 426 may receive one or more current locations of the wireless tracker to determine that the shipment has cleared customs, state lines, or country borders. The location processing module 426, at a preconfigured time or location of the wireless tracker, or upon request, provide the current location to the notification/user input module 424 to notify the current location of the shipment to the shipper computing device.

The route processing module 428 may receive one or more current locations of the wireless tracker from the location processing module 426. Further, the route processing module 428 may determine a shipment origin as well as possible shipment destinations based on the one or more current locations of the wireless tracker. In addition, the route processing module 428 may receive one or more additional current locations of the wireless tracker as well as access then process prior route delivery information and determines one of the possible shipment destinations are to excluded based on the one or more additional current locations. Moreover, the route processing module 428 may receive a current location of the wireless tracker and determines that the shipment has made a route deviation. Such a route deviation is communicated to the notification/user input module 424 to notify the shipper computing device.

The control module 430 includes software and hardware functions that assist in performing certain tasks for the computer serve 405 such as providing access to a communication link (e.g. wired, wireless, Bluetooth, infra-red, RF, etc.), executing an operating system, managing software drivers for peripheral components, and processing information. In addition, the control module 430 may also include software drivers for peripheral components, user interface computer programs, debugging and troubleshooting software tools. Also, the control module 430 may include an operating system. Such operating systems are known in the art for computer server 405 and may include computer operating systems (e.g. Windows, Linux, UNIX, and MacOS, etc.).

Each of the communication interfaces (435-450) may be software or hardware associated in communicating to other devices. The communication interfaces (435-450) may be of different types that include a user interface, USB, Ethernet, WiFi, WiMax, wireless, optical, cellular, or any other communication interface coupled to a communication network. One or more of the communication interfaces (435-450) may be coupled to a user interface known in the art.

An intra-device communication link 455 between the processor bank 410, storage device bank 415, modules 417, and communication interfaces (435-450) may be one of several types that include a bus or other communication mechanism.

Figure 5:
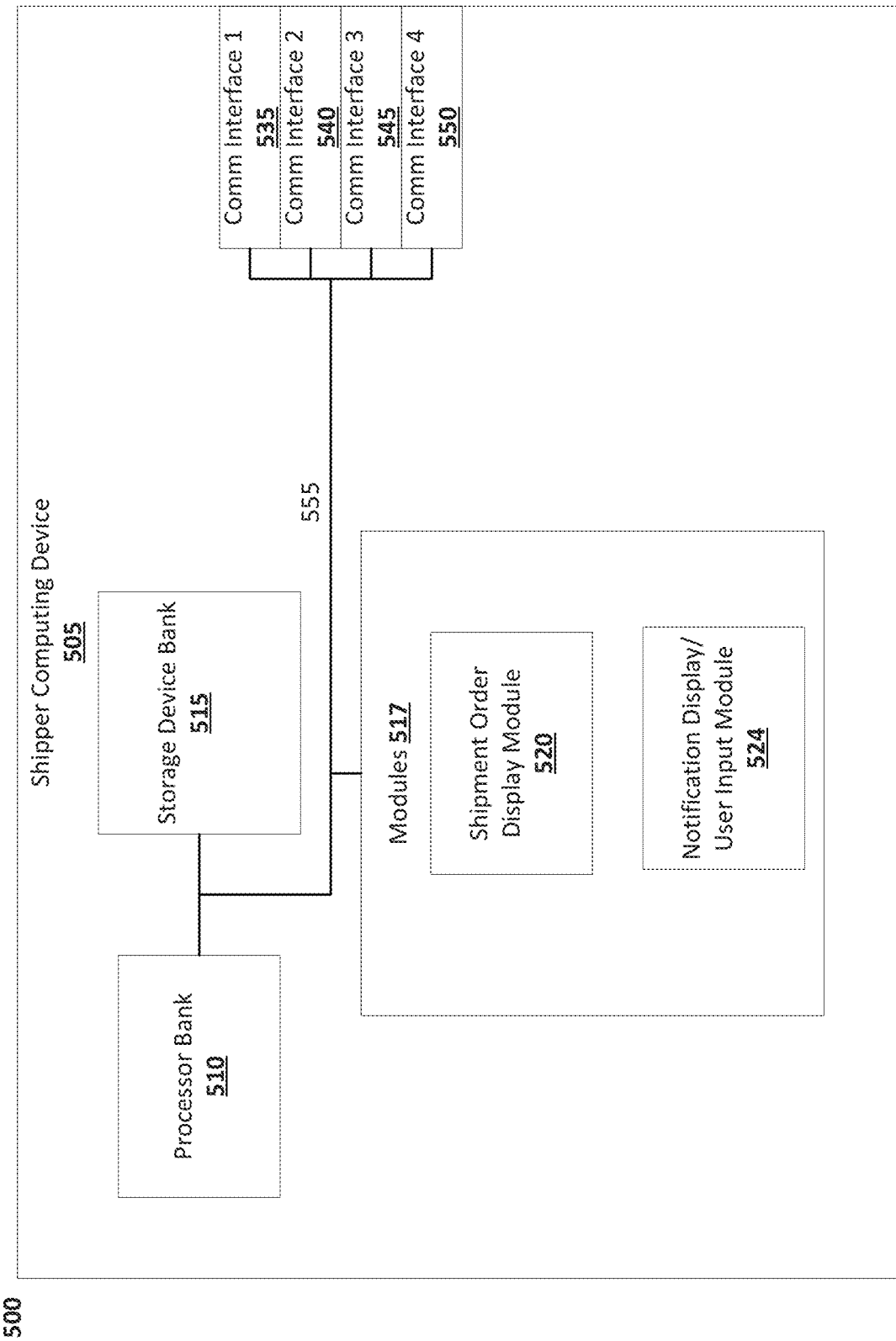

FIG. 5 is functional block diagram of a shipper computing device 505 for generating a shipment order as well as receiving trigger event notifications based on wireless tracker information, in accordance with some embodiments. Such a shipper computing device 505 may be used in a system shown in FIG. 1. The shipper computing device 505 may include several different components such as a processor bank 510, storage device bank 515, one or more software applications, which may be executed by a processor. Thus, the combination of the software applications as well as the processor and any other hardware form specifically-configured modules 517. The shipper computing device 505 also has one or more communication interfaces (535-550). The processor bank 510 may include one or more processors that may be co-located with each other or may be located in different parts of the shipper computing device 505. The storage device bank 515 may include one or more storage devices. Types of storage devices may include electronic memory, optical memory, and removable storage media. The one or more modules 517 may include, but are not limited to, a shipment order display module 520 and a notification display/user input module 524. The modules 517 may be implemented by the one or more processors in the processor bank 510. Examples of shipper computing devices, include, but are not limited to, desktop computers, laptop computers, tablet computers, smartphones, and any other computing devices.

The shipment order display module 520 may receive (via communication interfaces (535-550)) shipment order from one or more computer servers described herein that generated a shipment order based on wireless tracker information associated with a shipment. Upon reviewing the shipment order, a user of the shipper computing device 505 may edit the shipment order. For example, the user may provide an updated list of contents for the shipment. Such user input may be entered into a user interface (one or of the communication interfaces (535-550)) and may be received by the notification display/user input module 524, then transmitted to one or more computer servers over one of the communication interfaces (535-550). Also, the notification display/user input module 524 may receive a notification from the computer server(s) via the communication interface (535-550) and display such a notification on a user interface.

Each of the communication interfaces (535-550) may be software or hardware associated in communicating to other devices. The communication interfaces (535-550) may be of different types that include a user interface, USB, Ethernet, WiFi, WiMax, wireless, optical, cellular, or any other communication interface coupled to a communication network. One or more of the communication interfaces (535-550) may be coupled to a user interface known in the art.

An intra-device communication link 555 between the processor bank 510, storage device bank 515, modules 517, and communication interfaces (535-550) may be one of several types that include a bus or other communication mechanism.

Figure 6A:
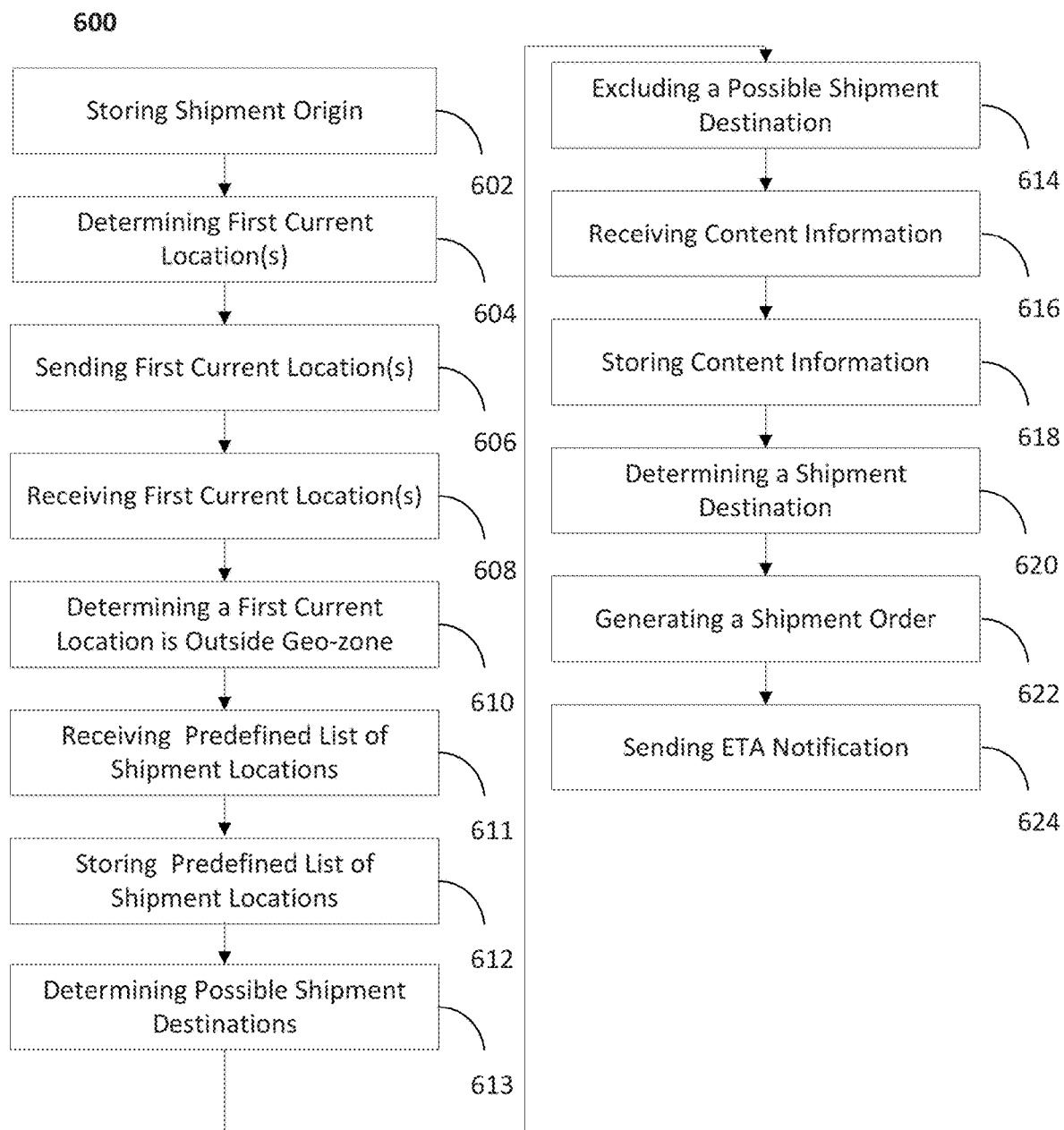
FIGS. 6A-6G are flowcharts that illustrates methods for generating a shipment order based on wireless tracker information, in accordance with some embodiments.

FIG. 6A is a flowchart that illustrates a method 600 for generating a shipment order based on wireless tracker information, in accordance with some embodiments. The method 600 includes storing a shipment origin for a shipment by a computer server, as shown in block 602. Further, the method 600 includes determining one or more first current locations for the wireless tracker using a global positioning system (GPS) by a wireless tracker, as shown in block 604. In addition, the method 600 includes sending the one or more of first current locations of the wireless tracker to the computer server by the wireless tracker, as shown in block 606. Moreover, the method 600 includes receiving the first current location of the wireless tracker by the computer server, as shown in block 608. Also, the method 600 includes determining whether the first current location is outside a shipment origin geo-zone by the computer server, as shown in block 610. Further, the method 600 includes receiving, by the computer server, the predefined list of shipment locations from a shipper computing device from the shipper or ad-hoc described herein, as shown in block 611. In addition, the method 600 includes storing, by the computer server, the predefined list of shipment locations in a storage device, as shown in block 612. Moreover, the method 600 includes determining possible shipment destinations, by the computer server, based on the first current location outside the shipment origin geo-zone and the predefined list of shipment locations, as shown in block 613. Also, the method 600 includes determining, by the computer server, that one of the shipment destinations is excluded based on the one of the first current locations, as shown in block 614. Further, the method 600 includes receiving, by the computer server, content information regarding the shipment, as shown in block 616. In addition, the method 600 includes storing, by the computer server, the content information regarding the shipment, as shown in block 618. Moreover, the method 600 includes determining a shipment destination based on the shipment origin, first current location, and a predefined list of shipment locations by the computer server, as shown in block 620. Also, the method 600 includes generating a shipment order based on the shipment destination and shipment origin by the computer server, as shown in block 622. Such a shipment order may be generated based on the content information as well as one or more predefined templates and shipment attributes such as editing contents or shipment attributes. Also, the computer server may receive user input to edit the shipment order. Further, the method 600 includes sending, by the computer server, a notification to a shipper computing device that includes an estimated time of arrival for the shipment based on the shipment destination and prior route delivery information for the shipment destination, as shown in block 624.

Figure 6B:
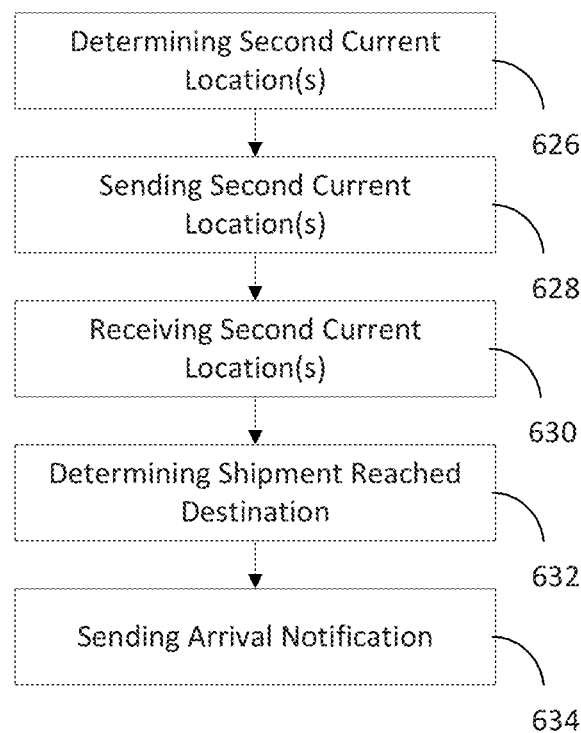

FIG. 6B is a flowchart that illustrates a method 625 for generating a shipment order based on wireless tracker information, in accordance with some embodiments. The method 625 includes determining, by the wireless tracker, one or more second current locations of the wireless tracker, as shown in block 626. Further, the method 625 includes sending, by the wireless tracker, the one or more second current locations of the wireless tracker to the computer server, as shown in block 628. In addition, the method 625 includes receiving, by the computer server, the one or more second current locations of the wireless tracker to the computer server, as shown in block 630. Moreover, the method 625 includes determining, by the computer server, whether the shipment has reached the shipment destination based on one of the one or more second current locations of the wireless tracker entering a destination geo-zone, as shown in block 632. Also, the method 625 includes sending, by the computer server, a notification to a shipper computing device that the shipment has reached the shipment destination based on one of the second current locations, as shown in block 634.

Figure 6C:
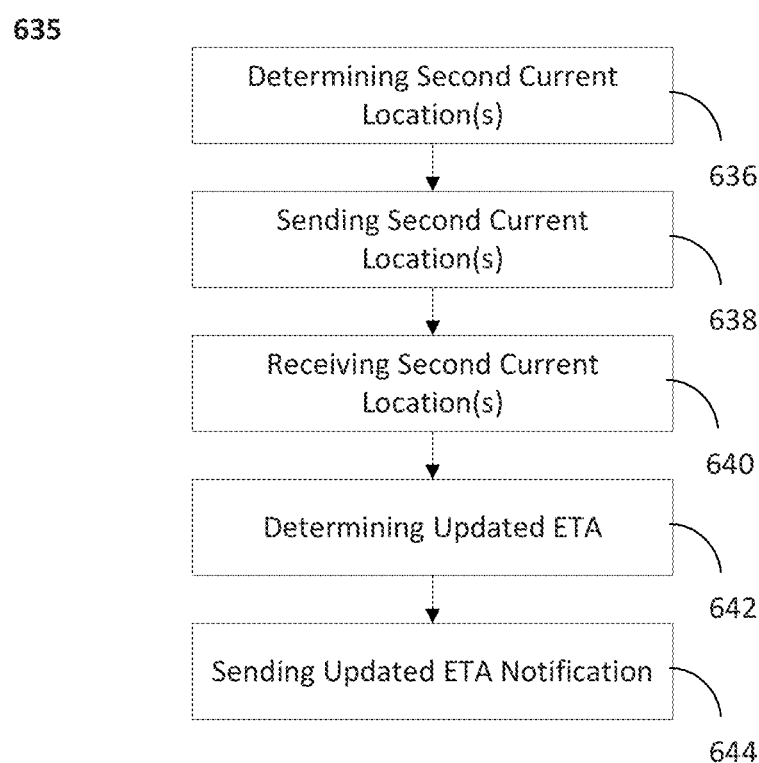

FIG. 6C is a flowchart that illustrates a method 635 for generating a shipment order based on wireless tracker information, in accordance with some embodiments. The method 635 includes determining, by the wireless tracker, one or more second current locations of the wireless tracker, as shown in block 636. Further, the method 635 includes sending, by the wireless tracker, the one or more second current locations of the wireless tracker to the computer server, as shown in block 638. In addition, the method 635 includes receiving, by the computer server, one or more second current locations of the wireless tracker, as shown in block 640. Moreover, the method 635 includes determining, by the computer server, an updated estimated time to arrival based on one of second current locations, as shown in block 642. Also, the method 635 includes sending, by the computer server, a notification to a shipper computing device with the update estimated time to arrival, as shown in block 644.

Figure 6D:
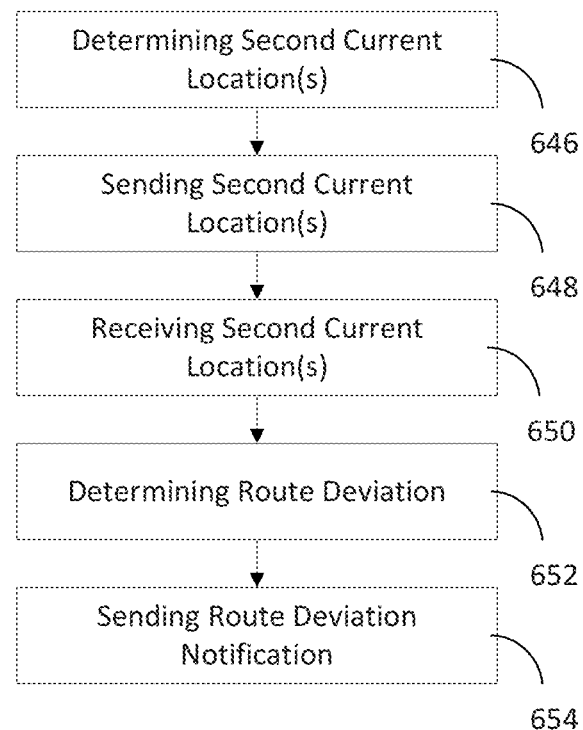

FIG. 6D is a flowchart that illustrates a method 645 for generating a shipment order based on wireless tracker information, in accordance with some embodiments. The method 645 includes determining, by the wireless tracker, one or more second current locations of the wireless tracker, as shown in block 646. Further, the method 645 includes sending, by the wireless tracker, the one or more second current locations of the wireless tracker to the computer server, as shown in block 648. In addition, the method 645 includes receiving, by the computer server, the one or more second current locations of the wireless tracker, as shown in block 650. Moreover, the method 645 includes determining, by the computer server, a route deviation of the shipment based on one of the second current locations, the shipment destination or possible shipment destinations, and prior route delivery information, as shown in block 652. Also, the method 645 includes sending, by the computer server, a notification to a shipper computing device that the there is a route deviation of the shipment, as shown in block 654.

Figure 6E:
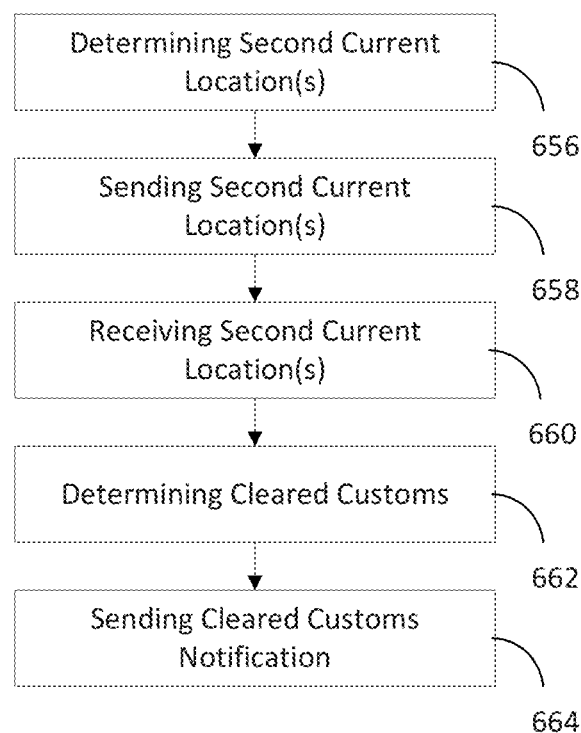

FIG. 6E is a flowchart that illustrates a method 655 for generating a shipment order based on wireless tracker information, in accordance with some embodiments. The method 655 include determining, by the wireless tracker, one or more second current locations of the wireless tracker, as shown in block 656. Further, the method 655 include sending, by the wireless tracker, the one or more second current locations of the wireless tracker to the computer server, as shown in block 658. In addition, the method 655 include receiving, by the computer server, the one or more second current locations of the wireless tracker, as shown in block 660. Moreover, the method 655 include determining, by the computer server, that shipment has cleared at least one of customs, state lines, and country borders based on one of the second current locations and a predefined list of customs locations, as shown in block 662. Also, the method 655 include sending, by the computer server, a notification to a shipper computing device that the shipment cleared at least one of customs, state lines, and country borders, as shown in block 664.

Figure 6F:
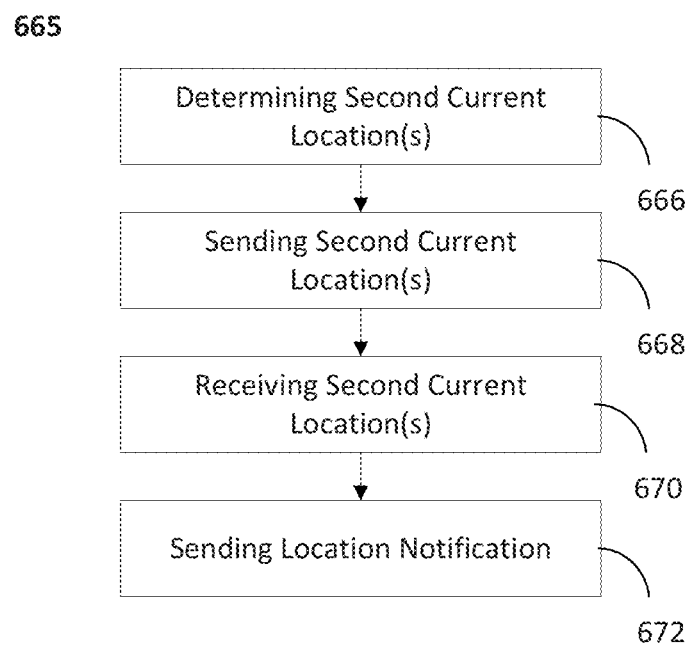

FIG. 6F is a flowchart that illustrates a method 665 for generating a shipment order based on wireless tracker information, in accordance with some embodiments. The method 665 includes determining, by the wireless tracker, one or more second current locations of the wireless tracker, as shown in block 666. Further, the method 665 includes sending, by the wireless tracker, the one or more second current locations of the wireless tracker to the computer server, as shown in block 668. In addition, the method 665 includes receiving, by the computer server, the one or more second current locations of the wireless tracker, as shown in block 670. Moreover, the method 665 includes sending, by the computer server, a notification to a shipper computing device that includes one of the second current locations of the wireless tracker, as shown in block 672. Such a notification can be provided upon a user request.

Figure 6G:
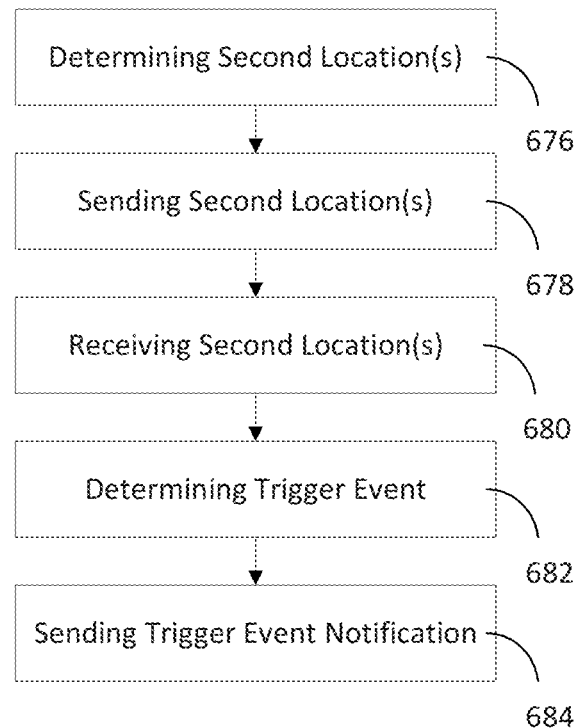

FIG. 6G is a flowchart that illustrates a method 675 for generating a shipment order based on wireless tracker information, in accordance with some embodiments. The method 675 includes determining, by the wireless tracker, one or more second current locations, and sensor information from one or more sensors of the wireless tracker, as shown in block 676. Further, the method 675 includes sending, by the wireless tracker, the one or more second current locations and corresponding time, and sensor information of the wireless tracker to the computer server, as shown in block 678. In addition, the method 675 includes receiving, by the computer server, the one or more second current locations of the wireless tracker and corresponding time, and sensor information, as shown in block 680. Moreover, the method 675 includes determining, by the computer server, a trigger event occurred based on at least one second current location, corresponding time, and sensor information, as shown in block 682. Also, the method 675 includes sending, by the computer server, a notification to a shipper computing device that includes the trigger event, as shown in block 684. A trigger event can be, but is not limited to, shipment exiting shipment origin, delay at an intermediate location, traveling after a delay, temperature deviation, humidity deviation, route deviation, accident to delivery vehicle, and shock to the delivery vehicle.

Persons of ordinary skill in the art understand that the steps of methods described herein can be implemented in any order and not limited to the order discussed in the present disclosure.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   receiving, via a computer server, a first global positioning system (GPS) signal transmitted from a wireless hardware sensor coupled to a shipment at a first point in time;
   determining that the shipment has left a point of origin based on a comparison of a geographical location included within the received first GPS signal and a geo-zone programmed into a digital map stored within memory of the computer server;
   in response to determining that the shipment has left the point of origin, determining a possible shipment destination based on a location of origin of the shipment, the geographical location included in the first GPS signal transmitted from the wireless hardware sensor, and map data retrieved from the digital map;
   determining an estimated time of arrival of the shipment based on the possible shipment destination and one or more analytics;
   retrieving a digital shipment order template from a storage device;
   generating a shipment order, via the computer server, by filling in predefined fields of the digital shipment order template with tracked routing information of the shipment including the possible shipment destination and the estimated arrival of time;
   transmitting the filled in digital shipment order template to a shipper computing device;
   receiving a second GPS signal transmitted from the wireless hardware sensor coupled to the shipment at a second point in time that is subsequent to the first point in time;
   determining that the shipment is delayed based on a comparison between the geographical location included in the first GPS signal and a geographical location included in the second GPS signals and the first and second points in time; and
   updating the estimated time of arrival based on the determined delay, updating the shipment order based on the updated estimated time of arrival, and transmitting the updated shipment order to the shipper computing device.

2. The method of claim 1, further comprising:
   receiving, by the computer server, a predefined list of shipment locations from the shipper computing device; and
   storing, by the computer server, the predefined list of shipment locations in a storage device.

3. The method of claim 1, further comprising:
   receiving, by the computer server, content information regarding the shipment from the shipper computing device; and
   storing, by the computer server, the content information regarding the shipment.

4. The method of claim 1, wherein the digital shipment order template is filled-in based on one or more shipment attributes.

5. The method of claim 1, further comprising:
   determining, by the computer server, whether the shipment has reached the shipment destination based on additional GPS signals received from the wireless hardware sensor; and
   sending, by the computer server, a notification to the shipper computing device that the shipment has reached the shipment destination.

6. The method of claim 1, further comprising:
   determining, by the computer server, an additional updated estimated time to arrival based on additional GPS signals transmitted from the wireless hardware sensor; and
   sending, by the computer server, a notification to the shipper computing device with the additional updated estimated time to arrival.

7. The method of claim 1, further comprising:
   sending, by the computer server, a notification to the shipper computing device that the there is a route deviation of the shipment based on the first and second GPS signals received from the wireless hardware sensor.

8. The method of claim 1, further comprising:
  determining, by the computer server, that shipment has cleared at least one of customs, state lines, and country borders based on additional GPS signals transmitted from the wireless hardware sensor and a predefined list of customs locations; and
  sending, by the computer server, a notification to the shipper computing device that the shipment cleared at least one of customs, state lines, and country borders.

9. The method of claim 1, further comprising:
  sending, by the computer server, a notification to the shipper computing device that includes additional locations included in additional GPS signals transmitted from the wireless-hardware sensor.

10. The method of claim 1, further comprising:
  determining, by the computer server, that the shipment has remained stationary at a location for longer than a time threshold;
  determining, by the computer server, that the shipment is at the shipment location when the shipment has remained stationary for longer than the time threshold; and
  sending, by the computer server, a notification to the shipper computing device that includes the shipment location and time.

11. The method of claim 1, further comprising:
  determining, by the computer server, a trigger event occurred based on additional GPS signals transmitted from the wireless hardware sensor, corresponding time, and sensor information; and
  sending, by the computer server, a notification to the shipper computing device that includes notification of the trigger event.

12. The method of claim 11, wherein the trigger event is at least one of a shipment exiting shipment origin, delay at an intermediate location, traveling after a delay, temperature deviation, humidity deviation, route deviation, accident to delivery vehicle, and shock to the delivery vehicle.

13. The method of claim 1, further comprising:
  receiving, by the computer server, information indicative of another current location from the wireless hardware sensor;
  determining, by the computer server, that the other current location is not a pre-defined location in a group of previously designated pre-defined locations;
  sending, by the computer server, information indicative of the other current location to the shipper computer device; and
  updating, by the computer server, a group of previously designated pre-defined locations to include the other current location.

14. The method of claim 1, further comprising:
  receiving sensor information from the wireless hardware sensor, and
  determining a trigger event based on the sensor information, wherein the sensor information includes at least one of environmental information, movement information, orientation information, or electrically based information and the trigger event includes at least one of the shipment exiting a location, a delay of the shipment at an intermediate location, travel after a delay, an accident or other condition of a delivery vehicle for the shipment, and a type of deviation.

* * * * *